United States Patent [19]

Keable

[11] 4,455,780
[45] Jun. 26, 1984

[54] EXPANDABLE FISHING LURE

[76] Inventor: Denis L. Keable, #106-1623 Haro St., Vancouver, British Columbia, Canada, V6G 1G8

[21] Appl. No.: 377,087

[22] Filed: May 11, 1982

[51] Int. Cl.³ .............................................. A01K 85/00
[52] U.S. Cl. ..................................... 43/42.04; 43/42.1
[58] Field of Search ................... 42/42.04, 35, 36, 37, 42/4.5, 42.24, 42.1

[56] References Cited

U.S. PATENT DOCUMENTS

| 1,183,527 | 5/1916 | Blodgett | 43/35 |
|---|---|---|---|
| 1,609,151 | 11/1926 | Bruenig | 43/35 |
| 2,608,786 | 9/1952 | Schwartz | 43/37 |
| 2,833,076 | 5/1958 | Corradi | 43/36 |
| 2,841,913 | 7/1958 | Pearson | 43/37 |
| 2,897,624 | 8/1959 | Yakel | 43/36 |
| 2,987,844 | 6/1961 | Hill | 43/26.2 |
| 3,163,956 | 1/1965 | Krutsch | 43/35 |
| 3,175,322 | 3/1965 | Snyder | 43/36 |
| 3,196,573 | 7/1965 | Emard | 43/35 |
| 3,938,275 | 2/1976 | Fukushima | 43/42.24 |

Primary Examiner—Gene P. Crosby
Attorney, Agent, or Firm—Carver & Co.

[57] ABSTRACT

An expandable fishing lure comprises a flexible body with an interior cavity. A resiliently biased pair of members within the cavity expands the body when released from a contracted position. A pin secures the members together in the contracted position and releases the members when a fish strikes the lure so the lure expands.

8 Claims, 8 Drawing Figures

EXPANDABLE FISHING LURE

BACKGROUND OF THE INVENTION

This invention relates to an expandable fishing lure with a flexible body.

As a conservation measure or out of personal preference some sports fishermen wish to avoid permanent injury or death of game fish. These fishermen receive sufficient satisfaction from securing the fish temporarily on the line and then playing with the fighting fish until the fish manages to release itself. A lure suitable for this type of sports fishing should be sufficiently realistic to attract the fish to strike while having the capability of temporarily holding the fish on the line after it strikes.

One approach to temporarily securing a fish is to provide an object on the end of the line which expands after it is received in the mouth of the fish. The expanded lure jams in the mouth of the fish and it is difficult for the fish to free itself from the lure. Expandable fishing lures are known as shown, for example, in U.S. Pat. No. 1,183,527 to Blodgett. U.S. Pat. No. 2,897,624 to Yakel shows an expandable fish hook adapted to catch a fish without permanent injury. This device incorporates a coil spring. A coil spring is also used in the fish hook shown in U.S. Pat. No. 3,175,322 to Snyder.

A lure made from a soft, pliable, flexible material is shown in U.S. Pat. No. 2,987,844 to Hill.

Other expander-type fish lures are shown in U.S. Pat. No. 2,841,913 to Pearson and No. 1,609,151 to Bruenig.

SUMMARY OF THE INVENTION

According to the invention, an expandable fishing lure comprises a flexible body with an interior cavity. A resiliently biased means within the cavity expands the body when released from a contracted position. There is means for securing the resiliently biased means in the contracted position and for releasing the resiliently biased means when a fish strikes the lure so the lure expands.

The resiliently biased means may comprise a pair of members for pressing against the flexible body on opposite sides of the cavity so the body expands transversely when the resiliently biased means is released from the contracted position.

The means for securing and releasing may comprise a loop on each member of the resiliently biased means. A pin means extends through the loop of both said members to secure the members in the contracted position. In this case there is means for connecting the pin means to a fishing line so the pin means is pulled out of the loops when a fish strikes the lure.

In a preferred form, the members are elongated and pivotally connected together at centers thereof in an X-shaped arrangement so each of the members has one end pressing against each said opposite side of the cavity.

The members may be generally flat and parallel. In this case, the resilient means comprises a coil spring compressed between the members in the contracted position.

In one example of the invention, the flexible body is in the shape of a fish.

The present invention offers significant advantages over the prior art in providing a humane means for temporarily securing game fish on a fishing line. In the contracted position, the expansion mechanism is entirely enclosed so the exterior of the lure can be shaped like a minnow or other bait suitable for the game fish. No exterior mechanism is necessary which could warn the game fish either visually or through unusual vibrations in the water. Moreover, having the mechanism enclosed within the flexible body reduces the risk of injuring the fish because the exterior of the body can have a smooth soft surface. The risk of the lure being snagged in weeds, logs or other underwater obstructions is reduced because of the streamlined shape of the exterior.

DESCRIPTION OF THE PREFERRED EMBODIMENTS

Figure 1:
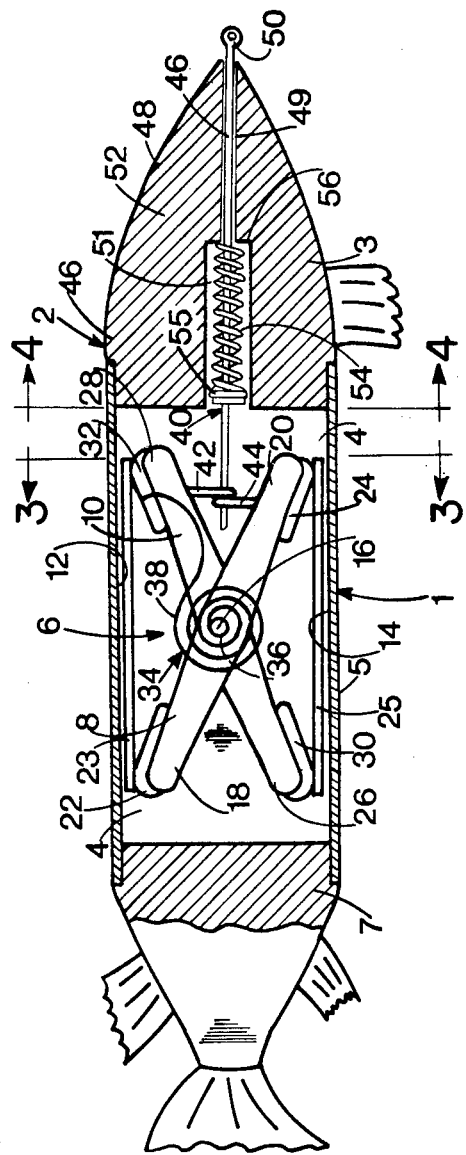
FIG. 1 is a side view, partly in section, of an expandable fishing lure according to a first embodiment of the invention shown in a contracted position.

Referring firstly to FIGS. 1 to 4, these illustrate an expandable fishing lure 1 which has a flexible body 2 in the shape of a fish. The body has a head portion 3, a central portion 5 and a tail portion 7. The central portion is tubular in shape and made of a resilient stretchable material such as rubber, synthetic substitutes or a suitable plastic such as PVC. The head portion and tail portion also may be of plastic. The tubular central portion is bonded to the head and tail portions to form an interior cavity 4. The cavity 4 provides a space for a resiliently biased mechanism 6 for expanding the central portion 5 of body 2 when the mechanism is released from a contracted position shown in FIG. 1. The mechanism 6 includes a pair of elongate members 8 and 10 for pressing on the body 2 on opposite sides 12 and 14 of the cavity. Members 8 and 10 are pivotally connected together in an "X" shaped arrangement by a rivet 16. Member 8 has a first end 18 and a second end 20. Pads 22 and 24 are connected to ends 18 and 20 respectively for pressing against flat members 23 and 25 on opposite sides of the inside of central portion 5. The members 8 and 10 are suitably made of metal or a hard plastic. Similarly, member 10 has ends 26 and 28 provided with pads 30 and 32. The pads and flat members distribute the force of members 8 and 10 against sides 12 and 14 of the cavity.

The members 8 and 10 are resiliently biased against the sides 12 and 14 of cavity 4 by means of a spiral spring 34. The spring 34 has a center coil 36 mounted at the center of member 8 and an outside coil 38 connected near end 28 of member 10. Spring 34 resiliently biases the ends of the members, the pads and flat members 23 and 25 against the sides 12 and 14 of the cavity.

Figure 2:
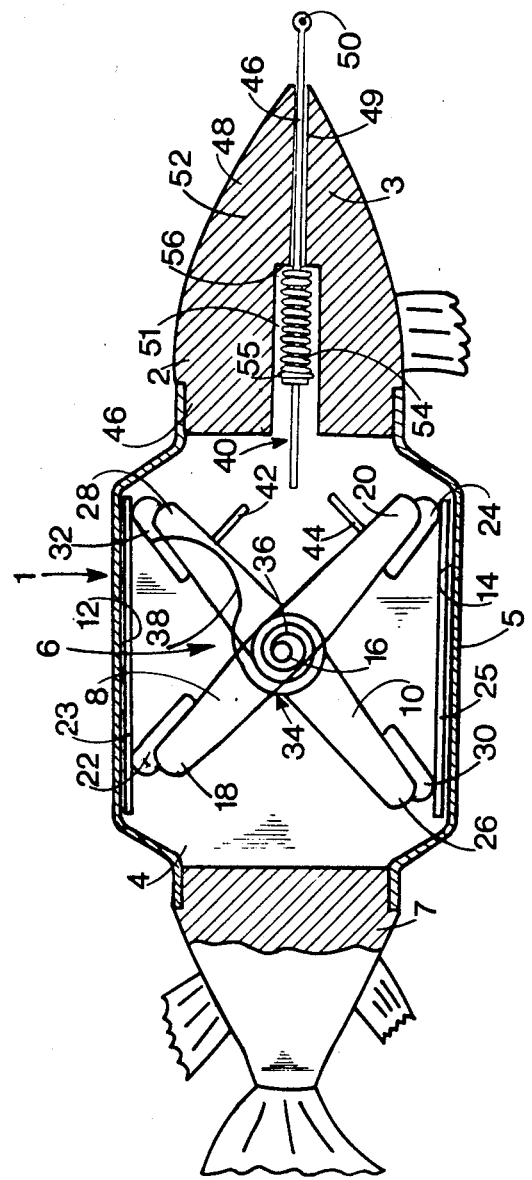
FIG. 2 is a side view of the lure of FIG. 1 in an expanded condition.
Figure 3:
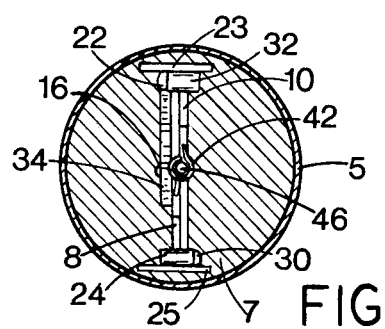
FIG. 3 is a sectional view taken along line 3—3 of FIG. 1.
Figure 4:
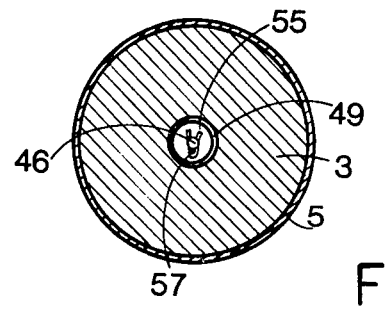
FIG. 4 is a sectional view taken along line 4—4 of FIG. 1.

The lure 1 also has a releasable latch device 40 which serves to secure mechanism 6 in the contracted position shown in FIG. 1 and releases the mechanism when a fish strikes so the lure expands to the position shown in FIG. 2. The latch device 40 secures the members 8 and 10 together in the contracted position of FIG. 1. The latch device includes a loop 42 connected to end 28 of member 10 and a similar loop 44 connected to end 20 of member 8. The loops are so positioned on the members that a pin 46 can extend through both loops when the lure is in the contracted position as shown in FIG. 1. The pin 46 extending through the loops secures mechanism 40 in the contracted position. The pin 46 is elongate and extends slidably to the exterior of the flexible body 2 at the front end 48 of the body through a small diameter bore 49 in head portion 3. A loop 50 on the end of pin 46 exterior to the body provides means for connecting the pin 46 to a fishing line so the pin is pulled out of the loops 42 and 44 when a fish strikes the lure.

A coil spring 54 is located within a larger diameter bore 51 in head portion 3 at the rearward end thereof. The coil spring 54 is compressed between a washer 55 on pin 46 and a shoulder 56 of bore 51 in head portion 3. The coil spring 54 serves to bias the pin 46 to the position shown in FIG. 1 where it extends through the loops. A positive pull on loop 50 against the tension of spring 54 is required to pull the pin from between the loops as shown in FIG. 2.

Figure 5:
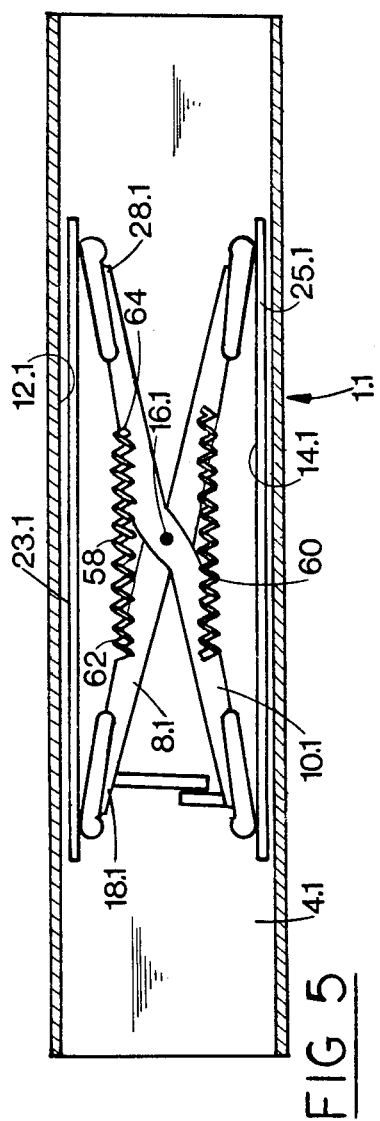
FIG. 5 is a side view, partly in section, of the central portion of an expandable fishing lure according to a second embodiment of the invention shown in a contracted condition.
Figure 6:
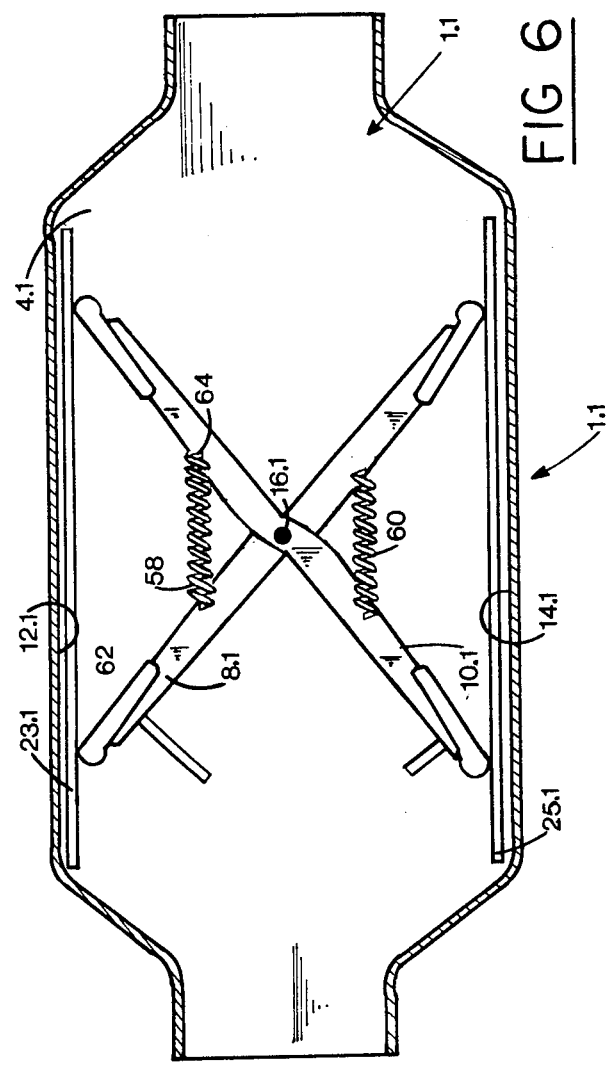
FIG. 6 is a side view of the central portion of the lure of FIG. 5 in an expanded condition.

A second embodiment of the invention is illustrated in FIGS. 5 and 6. Lure 1.1 is generally the same as lure 1 shown in FIGS. 1 and 2 so the head portion, tail portion and most of the latch device are omitted in the drawings. Lure 1.1 has a pair of coil springs 58 and 60 used to bias the ends of members 8.1 and 10.1 and flat members 23.1 and 25.1 against sides 12.1 and 14.1 of cavity 4.1. Each end of each of the coil springs is connected to one of the members between the rivet 16.1 at the center of the members and an end of the member. For example, end 62 of spring 58 is connected between rivet 16.1 and end 18.1 of member 8.1. Its opposite end 64 is connected midway between rivet 16.1 and end 28.1 of member 10.1. It may be seen that the coil springs 58 and 60 serve to resiliently bias the ends of members 8.1 and 10.1 against the sides 12.1 and 14.1 of the cavity.

Figure 7:
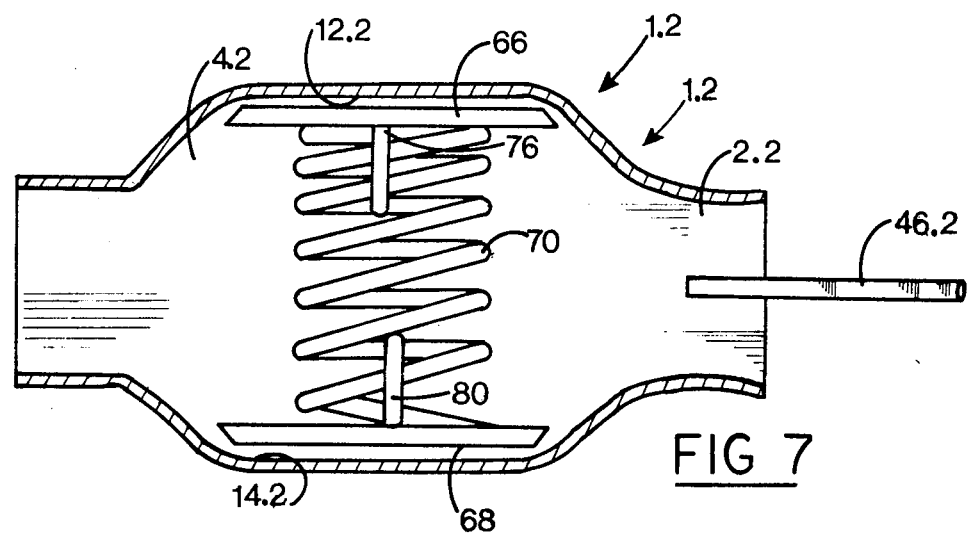
FIG. 7 is a side view of a central portion of a lure according to a third embodiment of the invention shown in an expanded condition.
Figure 8:
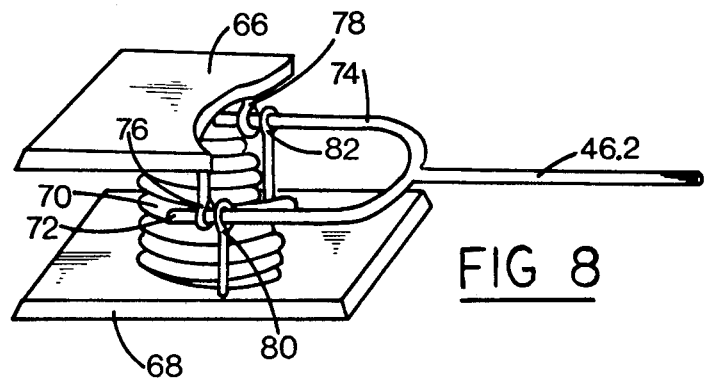
FIG. 8 is an isometric view, partly broken away, of the resiliently biased means and the means for securing the resiliently biased means of the lure of FIG. 7 shown in a contracted condition.

FIGS. 7 and 8 illustrate a third embodiment of the invention. Lure 1.2 is generally the same as lure 1 of FIGS. 1 to 4 so the head portion and tail portion are omitted. Instead of the X-shaped arrangement of members found in the previous two embodiments, lure 1.2 has a coil spring 70 between flat, parallel members 66 and 68. The coil spring 70 is compressed between the members 66 and 68 in the contracted position shown in FIG. 8. Spring 70 serves to resiliently bias members 66 and 68 against the sides 12.2 and 14.2 of cavity 4.2.

This embodiment is provided with a bifurcated pin 46.2 with two ends 72 and 74. A pair of loops 76 and 78 are connected to member 66 on opposite sides of coil spring 70. Similarly, a pair of loops 80 and 82 are connected to member 68. End 72 of pin 46 extends through the loops 76 and 80 on one side of coil spring 70, while end 74 of the pin extends through loops 78 and 82 on the other side of spring 70 when the lure is in the contracted position as shown in FIG. 8. The ends 72 and 74 of the pin 46 are pulled out of the loops when a fish strikes so that members 66 and 68 are spread apart by coil spring 70 to expand the lure as seen in FIG. 7.

The use of the lure is explained with reference to FIGS. 1 and 2. The loop 50 on the end of pin 46 is connected to a fishing line. The lure is placed in the contracted position of FIG. 1 by pulling loop 50 and pin 46 outwardly and then squeezing together the top and bottom of central portion 5 of the lure so that loops 42 and 44 come together. The pin is then released and coil spring 54 moves the pin into engagement through loops 42 and 44. This holds the members 8 and 10 in the contracted position shown. The lure is then used in the customary fashion on the end of the fishing line.

When a game fish is attracted to the lure, it takes the lure in its mouth. The pull on the lure by the game fish causes the fishing line to pull pin 46 outwardly relative to loops 42 and 44 as shown in FIG. 2. This releases members 8 and 10 so coil spring 54 moves the members to the expanded position shown in FIG. 2. The body expands transversely as shown in FIG. 2 so that the lure becomes wedged in the mouth of the game fish. No permanent injury is caused the fish, but this does permit the fisherman to play the fish on the end of the line for awhile until the fish is able to expel the lure from its mouth.

The operation of the other embodiments is similar to that of FIGS. 1 and 2.

It may be observed that it is easier to engage the pin 46 in loops 42 and 44 if the body 2 is translucent and many resilient plastics may be used which have this quality.

What is claimed is:

1. An expandable fishing lure comprising:
   a flexible body with an interior cavity;
   resiliently biased means within the cavity for expanding the body when released from a contracted position, the resiliently biased means being a pair of members for pressing against the flexible body on opposite sides of the cavity so the body expands transversely when the resiliently biased means is released from the contracted position, and the members being elongated and pivotally connected together at centers thereof in an X-shaped arrangement so each of the members has one end pressing against each said opposite side of the cavity; and
   means for securing the resiliently biased means in the contracted position and for releasing the resiliently biased means when a fish strikes the lure so the lure expands.

2. A lure as claimed in claim 1, wherein the resiliently biased means comprises a spring resiliently biasing the ends of the members against the sides of the cavity.

3. A lure as claimed in claim 2, wherein the spring comprises a spiral spring having a center coil mounted at the center of one said member and an outside coil connected near one end of another said member.

4. A lure as claimed in claim 2, wherein the spring comprises a coil spring having one end connected to one said member between the center and one end of the one member and another end connected to another said member between the center and one end of said another member.

5. A lure as claimed in claim 1, wherein the resiliently biased means further comprises pads on the ends of the members for operatively pressing against the flexible body.

6. An expandable fishing lure comprising:
   a flexible body with an interior cavity;

resiliently biased means within the cavity for expanding the body when released from a contracted position, the resiliently biased means comprising a pair of members for pressing against the flexible body on opposite sides of the cavity so the body expands transversely when the resiliently biased means is released from the contracted position, the members being generally flat and parallel, the resilient means comprising a coil spring compressed between the members in the contracted position; and means for securing the resiliently biased means in the contracted position and for releasing the resiliently biased means when a fish strikes the lure so the lure expands.

7. A lure as claimed in claim 6, wherein the means for securing and releasing comprises a pair of loops on each said member, one loop of each said pair being on opposite sides of the coil spring, a bifurcated pin means having two ends, each end of the pin means extending through the loops of both said members on one side of the coil spring, and means for connecting the pin means to a fishing line so the pin means is pulled out of the loops when a fish strikes the lure.

8. An expandable fishing lure comprising:

a flexible body with an interior cavity;

resiliently biased means within the cavity for expanding the body when released from a contracted position, the resiliently biased means being a pair of members for pressing against the flexible body on opposite sides of the cavity so the body expands transversely when the resiliently biased means is released from the contracted position;

means for securing the resiliently biased means in the contracted position and for releasing the resiliently biased means when a fish strikes the lure so the lure expands, the means for securing and releasing securing the members of the resiliently biased means together in the contracted position, the means for securing and releasing being a loop on each said member of the resiliently biased means, a pin means for extending through the loops of both said members to secure the members in the contracted position, and means for connecting the pin means to a fishing line so the pin means is pulled out of the loops when a fish strikes the lure; and resilient means for biasing the pin means so it extends through the loops.

* * * * *